United States Patent [19]

Depuydt et al.

[11] Patent Number: 5,011,114
[45] Date of Patent: Apr. 30, 1991

[54] CONTROL VALVE WITH DISPLACEMENT-COMPENSATING SEAL

[75] Inventors: Kent T. Depuydt, Bevent; Joseph S. Tikalsky, Weston, both of Wis.

[73] Assignee: Zimpro Passavant Environmental Systems, Inc., Rothschild, Wis.

[21] Appl. No.: 475,586

[22] Filed: Feb. 5, 1990

[51] Int. Cl.⁵ ............................................. F16K 51/00
[52] U.S. Cl. ................................... 251/144; 137/375; 285/158
[58] Field of Search ....................... 251/118, 122, 144; 285/158; 137/375

[56] References Cited

U.S. PATENT DOCUMENTS

| 3,432,187 | 3/1969 | Mooney et al. | 285/158 |
|---|---|---|---|
| 4,128,109 | 12/1978 | Chervenak et al. | 251/118 |
| 4,139,461 | 2/1979 | Bauer | 210/63 |
| 4,217,218 | 8/1980 | Bauer | 210/63 |
| 4,413,646 | 11/1983 | Platt et al. | 251/122 |
| 4,437,686 | 3/1984 | Wingate | 285/158 |
| 4,492,392 | 1/1985 | Woods et al. | 285/158 |
| 4,593,940 | 6/1986 | Wilder | 285/158 |
| 4,620,563 | 11/1986 | Meidl et al. | 137/572 |
| 4,749,492 | 6/1988 | Berrigan, Jr. et al. | 210/616 |

FOREIGN PATENT DOCUMENTS 1425730 12/1968 Fed. Rep. of Germany ...... 251/122

Primary Examiner—A. Michael Chambers
Attorney, Agent, or Firm—Tipton L. Randall

[57] ABSTRACT

An apparatus for controlling the blowdown slurry from a wet oxidation reactor is disclosed. The device includes a pressure control valve with a valve seat and support assembly which extends beyond the valve body to prevent erosion by the blowdown slurry. The apparatus also includes a displacement-compensating seal between the valve and receiving vessel to allow for thermal expansion and contraction during the blowdown cycle while maintaining the integrity of the seal.

8 Claims, 1 Drawing Sheet

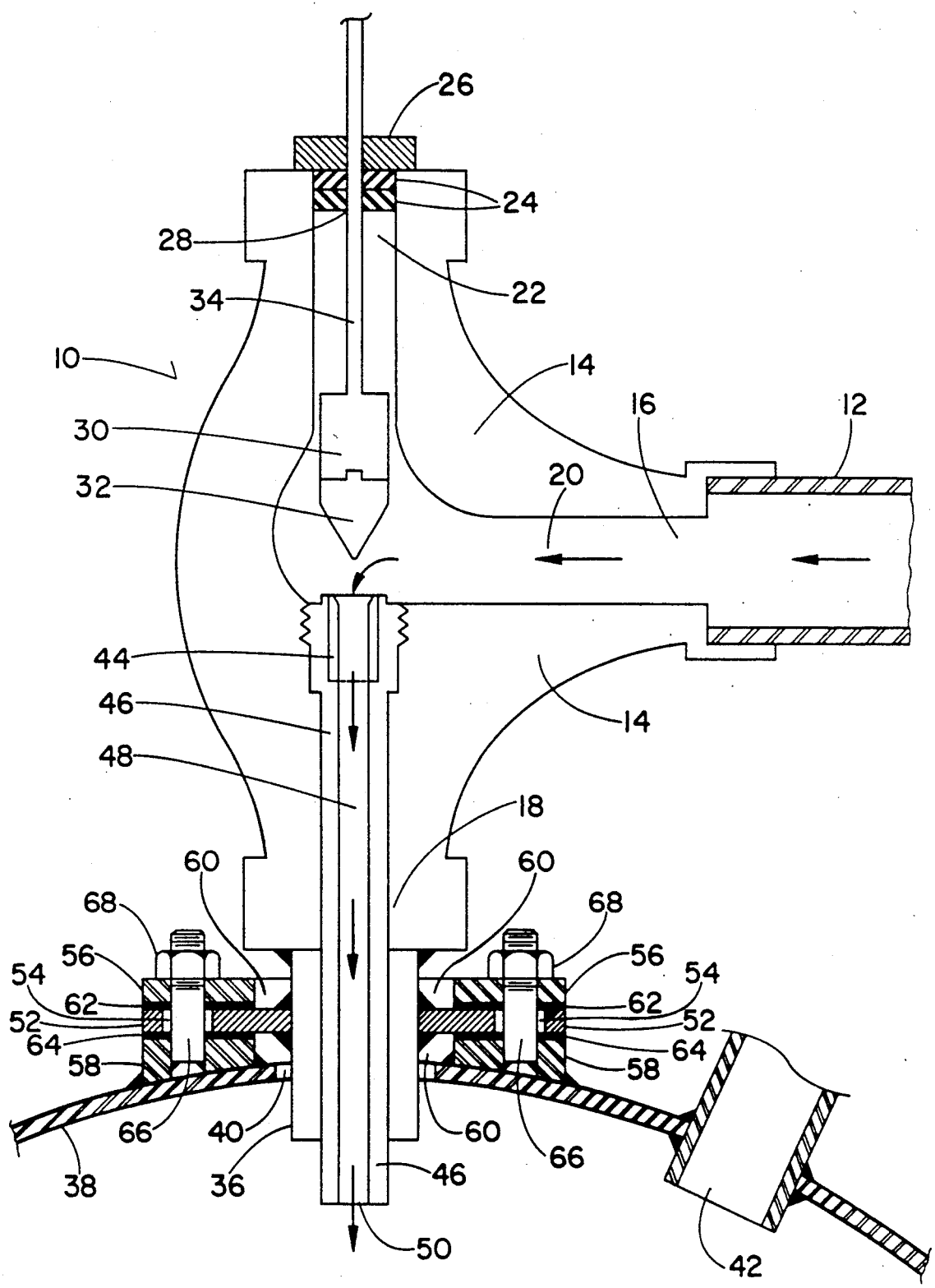

CONTROL VALVE WITH DISPLACEMENT-COMPENSATING SEAL

BACKGROUND OF THE INVENTION

1. Field of the Invention

This invention relates to a control valve with displacement-compensating seal apparatus which is useful for handling abrasive fluids.

2. Information Disclosure Statement

Pressurized reactors have been used at elevated temperatures in the oxidation of biomass/powdered activated carbon slurry for carbon regeneration, or for materials conditioning, such as thermal conditioning of wastewater sludges. Inert solids accumulation in the lower portion of the reactor necessitates their removal for proper system operation. The removal of solids during system operation requires a controlled, intermittent transfer of an abrasive slurry from a heated, pressurized vessel to ambient temperature and pressure conditions. A conduit fitted with a pressure control valve is used for this controlled, intermittent transfer of the slurry from the reactor to a discharge receiving vessel. The above described process is often termed a blowdown cycle for solids removal from a wet oxidation pressure reactor.

The removal of solids from a wet oxidation reactor through a pressure control valve is described by Bauer in U.S. Pat. No. 4,139,461 and No. 4,217,218. The hot slurry from the reactor is mixed with cold water prior to traversing the pressure control valve to reduce wear on that valve.

Berrigan et al. in U.S. Pat. No. 4,749,492 disclose removing a blowdown slurry of grit ash and regenerated powdered activated carbon from a wet oxidation reactor through a valve, then diluting the slurry with water for subsequent recovery of powdered activated carbon.

A receiving vessel or blowdown pot for collecting a slurry from a wet oxidation reactor is disclosed by Meidl et al. in U.S. Pat. No. 4,620,563. The slurry enters the blowdown pot from the reactor through a pressure control valve.

Passing a pressurized, hot slurry from a reactor to a receiving vessel results in high velocity, abrasive fluid traversing the pressure control valve, as well as the generation of large volumes of water vapor or steam as the slurry reaches atmospheric temperature and pressure. The pressure control valve is best located close to the receiving vessel to minimize wear on any piping connecting the control valve and receiving vessel. The receiving vessel contains liquid water to cushion the slurry transfer and concurrent water vaporization. To retain the water vapor, steam and solids within the receiving vessel as the slurry reaches ambient conditions, the pressure control valve is best securely fastened to the receiving vessel. The intermittent nature of the operation of this transfer system results in thermal expansion and contraction of the piping and valves between the pressurized vessel and the receiving vessel. To maintain the integrity of the connection between the pressure control valve and the receiving vessel, and to prevent overstressing the piping and equipment connections, a so-called expansion loop of piping is placed between the pressurized vessel and the pressure control valve to compensate for and absorb the thermal expansion of the system. The expansion loop is designed with several bends in the piping, resulting in areas where solids from the slurry may collect and obstruct the flow through the loop. A direct run of piping would help solve the plugging problem, but this reduces piping flexibility and increases stress in the piping and equipment connections to beyond acceptable levels due to thermal expansion.

Further, the pressure control valve must withstand internal pressures up to 7,584 KPa (1100 psig) and temperatures up to 260° C. (500° F.) as well as high velocity slurry particles impacting the valve seat. The abrasive nature of the depressurizing slurry within commonly available pressure control valves results in severe erosion problems, even though the valve seats and plugs can be made of erosion-resistant materials such as ceramics. The high velocity depressurizing slurry generated within the pressure control valve can wear away other non-ceramic portions of the pressure control valve body, requiring frequent replacement of the whole valve unit.

To overcome the plugging problem associated with the expansion loop and the erosion problem of the abrasive, high velocity, depressurizing slurry, a new pressure reducing control valve with displacement compensating external seal has been invented.

SUMMARY OF THE INVENTION

This invention comprises a control valve with displacement-compensating seal. The valve has a unique extended valve seat which relocates the discharge of an abrasive slurry emanating from the valve seat orifice to a position outside the valve body. With the control valve mounted in an opening to a receiving vessel, the rapid expansion of pressurized gases and liquid vaporization thus takes place in the receiving vessel rather than in the valve body itself, greatly reducing the internal wear to the valve body by the abrasive slurry coming from the pressurized reactor. With the control valve mounted at the receiving vessel, a direct run of piping between the valve and reactor minimizes the solids plugging problem, but does not provide the necessary piping flexibility to compensate for thermal expansion.

The displacement-compensating seal between the control valve and the discharge receiving vessel is therefore provided which allows control valve movement relative to that vessel caused by thermal expansion and contraction of piping and valves between the reactor and receiving vessel while maintaining the integrity of the seal. The short, direct run of piping which produces the displacement prevents solids from plugging the pathway between reactor and receiving vessel during the blowdown cycle.

The valve and seal apparatus comprises a valve body with an inlet and an outlet and a fluid passageway therebetween, said valve body having an opening therein on the side opposite said outlet;

a sealing means within said opposite side opening with an aperture therein;

an outlet nozzle member connected to said valve body outlet, said nozzle member extending into a discharge receiving vessel through an aperture therein;

a valve seat and support assembly with longitudinal aperture therein, said seat and support assembly positioned within said passageway between said inlet and said outlet, said support assembly extending from said passageway, through said outlet and beyond the end of said outlet nozzle member into said discharge receiving vessel;

a valve member in said passageway between said inlet and said outlet, said valve member movable toward said valve outlet for seating against said valve seat for sealing said passageway against fluid flow therethrough, said valve member extending through said aperture in the sealing means within said opening opposite the outlet, and extending beyond said valve body; and sealing means between said outlet nozzle and said discharge receiving vessel adapted to allow displacement of said valve body and nozzle relative to said receiving vessel, while preventing escape of fluid entering said receiving vessel from said valve.

The displacement-compensating seal comprises a central plate concentrically sealed (welded) to said outlet nozzle member;

an upper plate above and a lower plate below said concentrically sealed central plate, said upper and lower plates each having an aperture larger than, and concentric to, said outlet nozzle member allowing movement of said nozzle member and connected central plate within said apertures, said lower plate also sealingly connected (welded) to said discharge receiving vessel;

sealing gaskets, a first gasket between said upper plate and said central plate and a second gasket between said lower plate and said central plate, said gaskets allowing movement of said nozzle member and connected central plate relative to said upper and lower plates; and fastening means between said lower plate and said upper plate, said fastening means maintaining said upper plate, first gasket, central plate, second gasket and lower plate in a fluid sealing, displacement-compensating relationship.

BRIEF DESCRIPTION OF THE DRAWING

The Figure is a vertical sectional view of the control valve and displacement-compensating seal of the invention.

DESCRIPTION OF THE PREFERRED EMBODIMENTS

Referring to the Figure, a pressure reducing valve with displacement-compensating exterior seal apparatus of the present invention is illustrated. The pressure control valve 10 receives the hot, pressurized blowdown slurry from the reactor through a conduit 12. The control valve is comprised of a valve body 14 with inlet opening 16 and outlet opening 18 and a fluid passageway 20 therebetween. The valve body also has an opening 22 opposite the valve outlet 18.

The opening 22 has sealing means comprising packing rings 24 and a packing retainer 26. This sealing means has an aperture 28 through which passes the valve member. The valve member is made up of a plug 30 with a ceramic tip 32 which is conical in shape, and a stem 34 which passes through the sealing means and allows movement of the valve member within the fluid passageway 20 as provided by an outside control means (not shown).

Connected to said valve body outlet 18 is an outlet nozzle member 36 which extends from the outlet 18 into a discharge receiving vessel 38 through an opening 40 in that vessel. The vessel is also fitted with a vent 42 to the atmosphere to release the gases generated during reactor blowdown.

Positioned within the passageway 20 is a valve seat 44 made of abrasion-resistant material, such as a ceramic, and a seat support assembly 46 with a longitudinal aperture 48 therethrough. The seat support assembly is held in position by being threaded into the valve body 14 as shown. Further, the seat support assembly 46, also made from abrasion-resistant material, extends from the valve body, through the outlet 18 and beyond the end of the outlet nozzle member 36 into said discharge receiving vessel. The depressurizing, abrasive slurry travels from the conduit 12 into the passageway 20, down through the longitudinal aperture 48 in the seat and support assembly and enters the vessel 38 through a discharge orifice 50 extending within the vessel.

The seat support assembly prevents erosion of the valve body or nozzle from the slurry by spraying the high velocity slurry into the receiving vessel itself. Any wear to the seat or support assembly is easily repaired by removing the worn unit and replacing it with a new unit. The control valve is isolated from the reactor by closing a block valve in the conduit between the control valve and the reactor. The repair is accomplished by removing the packing and valve member from the valve body through the opening 22 and exchanging the valve seat and support assembly through that same opening. This prevents costly replacement of the whole pressure control valve. The seat support assembly fits snugly within that portion of passageway 20 and outlet nozzle 36 downstream of the valve seat.

In operation, the pressure control valve is held closed for the majority of the time by moving the valve member into sealing contact with the valve seat 44 to prevent slurry flow through the valve. During the blowdown cycle, the upstream block valve, also closed the majority of the time, opens and allows slurry to flow from the reactor into the conduit 12. The control valve 10 then opens by moving the valve member away from the seat 44, as seen in the Figure, allowing the hot, pressurized slurry to flow into the receiving vessel 38. The pressure control valve generally opens for 30 to 60 seconds during a blowdown cycle which occurs every hour or two of system operation. At the end of that 30 to 60 seconds of blowdown, the pressure control valve closes by moving the valve member into contact with the seat 44, stopping the slurry flow therethrough. Shortly thereafter, the upstream block valve also closes, isolating the pressure control valve from the reactor. Any conventional valve actuating means can be used to open and close the pressure control valve and block valve.

The use of a direct run of conduit between the reactor and the pressure control valve 10 to prevent plugging by slurry particles results in some displacement of the valve and conduit relative to the receiving vessel due to thermal expansion of the conduit and valve. The displacement-compensating seal thus maintains a secure seal between the valve and the receiving vessel. The seal comprises a central plate 52 concentrically sealed, such as by welding, to the outlet nozzle member 36. There are a plurality of holes 54 in the central plate as well. Positioned above and below the central plate 52 are upper and lower plates 56 and 58 respectively. The lower plate is connected to the receiving vessel 38. These plates (56 and 58) each contain apertures 60 larger than, and concentric to, the outlet nozzle member 36 which allows movement of the nozzle 36 and connected central plate 52 within said apertures.

Further, a first sealing gasket 62 is located between the upper plate 56 and the central plate 54, while a second sealing gasket 64 is located between the central plate and the lower plate 58. Fastening means is provided in the form of threaded studs 66 which extend from the lower plate 58, though the apertures 54 in the central plate 52 and through the upper plate 56. Threaded nuts 68 hold the plates and gaskets in a fluid sealing, displacement-compensating relationship.

The holes 54 in the central plate are large enough to allow movement of that plate 52 relative to the studs 66 holding the seal in place. Further, an anti-seize, high temperature lubricant, such as Rockwell No. 921 valve lubricant, may be applied to the gaskets to allow easier movement of the central plate 52 within the seal assembly while preventing escape of gases, steam, water vapor and slurry particles from the receiving vessel during the blowdown cycle from the reactor.

We claim:

1. A pressure reducing control valve with displacement-compensating exterior seal apparatus, said valve and seal apparatus comprising;

a valve body with an inlet and an outlet and a fluid passageway therebetween, said valve body having an opening therein on the side opposite said outlet;

a sealing means within said opposite side opening with an aperture therein;

an outlet nozzle member connected to said valve body outlet, said nozzle member extending into a discharge receiving vessel through an aperture therein;

a valve seat and support assembly with longitudinal aperture therein, said seat and support assembly positioned within said passageway between said inlet and said outlet, said support assembly extending from said passageway, through said outlet and beyond the end of said outlet nozzle member into said discharge receiving vessel;

a valve member in said passageway between said inlet and said outlet, said valve member movable toward said valve outlet for seating against said valve seat for sealing said passageway against fluid flow therethrough, said valve member extending through said aperture in the sealing means within said opening opposite the outlet, and extending beyond said valve body; and sealing means between said outlet nozzle and said discharge receiving vessel adapted to allow displacement of said valve body and nozzle relative to said receiving vessel, while preventing escape of fluid entering said receiving vessel from said valve.

2. A valve and seal apparatus according to claim 1, wherein said sealing means between said outlet nozzle and said discharge receiving vessel comprises;

a central plate concentrically sealed to said outlet nozzle member;

an upper plate above and a lower plate below said concentrically sealed central plate, said upper and lower plates each having an aperture larger than, and concentric to, said outlet nozzle member allowing movement of said nozzle member and connected central plate within said apertures, said lower plate also sealingly connected to said discharge receiving vessel;

sealing gaskets, a first gasket between said upper plate and said central plate and a second gasket between said lower plate and said central plate, said gaskets allowing movement of said nozzle member and connected central plate relative to said upper and lower plates; and fastening means between said lower plate and said upper plate, said fastening means maintaining said upper plate, first gasket, central plate, second gasket and lower plate in a fluid sealing, displacement-compensating relationship.

3. A valve and seal apparatus according to claim 2, wherein said concentrically sealed central plate contains a plurality of apertures therein; and said fastening means comprises a like plurality of threaded studs extending from said lower plate, through said apertures in said central plate and connected to said upper plate to maintain a seal between said central plate and outlet nozzle and said discharge receiving vessel.

4. A valve and seal apparatus according to claim 3 wherein said plurality of apertures in said concentrically sealed central plate are sufficiently large to allow movement of said central plate relative to said threaded studs extending through said aperatures.

5. A valve and seal apparatus according to claim 1, wherein said valve seat and support assembly are made of abrasion-resistant material.

6. A valve and seal apparatus according to claim 1, wherein said valve member comprises a plug fitted for sealing against said valve seat, and a stem connected to said plug, said stem extending through the aperture in the sealing means within said opening opposite said valve body outlet.

7. A valve and seal apparatus according to claim 6, wherein said plug has a conical tip of abrasion-resistant material fitted for sealing against said valve seat.

8. A valve and seal apparatus according to claim 1, wherein said sealing means within the opposite side opening comprises a plurality of packing rings and a packing retainer for sealing said opposite side opening against fluid flow therethrough.

* * * * *